US012602541B2

(12) United States Patent
Roitman

(10) Patent No.: US 12,602,541 B2
(45) Date of Patent: Apr. 14, 2026

(54) MINIMIZING LARGE LANGUAGE MODEL HALLUCINATIONS IN GENERATED SUMMARIES

(71) Applicant: eBay Inc., San Jose, CA (US)

(72) Inventor: Haggai Roitman, Netanya (IL)

(73) Assignee: EBAY INC., San Jose, CA (US)

( * ) Notice: Subject to any disclaimer, the term of this patent is extended or adjusted under 35 U.S.C. 154(b) by 175 days.

(21) Appl. No.: 18/644,842

(22) Filed: Apr. 24, 2024

(65) Prior Publication Data

US 2025/0335703 A1 Oct. 30, 2025

(51) Int. Cl.
G06F 40/20 (2020.01)
(52) U.S. Cl.
CPC .................................... G06F 40/20 (2020.01)
(58) Field of Classification Search
CPC ...................................................... G06F 40/20
See application file for complete search history.

(56) References Cited

U.S. PATENT DOCUMENTS

| | | |
|---|---|---|
| 11,769,017 B1 | 9/2023 | Gray et al. |
| 11,875,130 B1 | 1/2024 | Bosnjakovic et al. |
| 11,875,240 B1 | 1/2024 | Bosnjakovic et al. |
| 12,008,332 B1 * | 6/2024 | Gardner ................ G06F 16/345 |
| 2023/0274086 A1 | 8/2023 | Tunstall-pedoe et al. |
| 2024/0038226 A1 | 2/2024 | Nouri et al. |
| 2025/0005050 A1 * | 1/2025 | Krishnan .............. G06F 16/243 |

FOREIGN PATENT DOCUMENTS

WO 2024015323 1/2024

OTHER PUBLICATIONS

"European Application Serial No. 25172062.9, Extended European Search Report mailed Sep. 18, 2025", 7 pgs.
Cao, Meng, "Hallucinated but Factual Inspecting the Factuality of Hallucinations in Abstractive Summarization", arXiv:2109.09784v2, (Dec. 6, 2021), 14 pgs.
Chern, I Chun, "FacTool Factuality Detection in Generative AI A Tool Augmented Framework for Multi Task and Multi Domain Scenarios", arXiv:2307.13528v2, (Jul. 26, 2023), 25 pgs.

(Continued)

*Primary Examiner* — Eric Yen
(74) *Attorney, Agent, or Firm* — SCHWEGMAN LUNDBERG & WOESSNER, P.A.

(57) ABSTRACT

Systems and methods are directed to minimizing hallucinations in a generated summary. A summary generation system embodied within a server triggers a large language model (LLM) to generate an initial summary for a subject. Based on the initial summary, the server prompts the LLM to generate a list of factual questions about the initial summary. The server then triggers the LLM to answer the list of factual questions without knowledge of the initial summary and using internal knowledge of the LLM. Questions from the list of factual questions that received a positive answer are identified. Based on the questions, the server prompts the LLM to generate a refined summary from the initial summary. The server then generates a user interface that presents the refined summary. Approval of the refined summary triggers generation of a publication using the refined summary.

20 Claims, 8 Drawing Sheets

(56)     References Cited

OTHER PUBLICATIONS

Dhuliawala, Shehzaad, "Chain of Verification Reduces Hallucination In Large Language Models", arXiv:2309.11495v2, (Sep. 25, 2023), 19 pgs.

Ji, Ziwei, "Survey of Hallucination in Natural Language Generation", ACM Journals ACM Computing Surveys vol. 55 No. 12, (Feb. 2022), 59 pgs.

Semnani, Sina J., "WikiChat Stopping the Hallucination of Large Language Model Chatbots by Few Shot Grounding on Wikipedia", WizarXiv:2305.14292v2, (Oct. 27, 2023), 27 pgs.

* cited by examiner

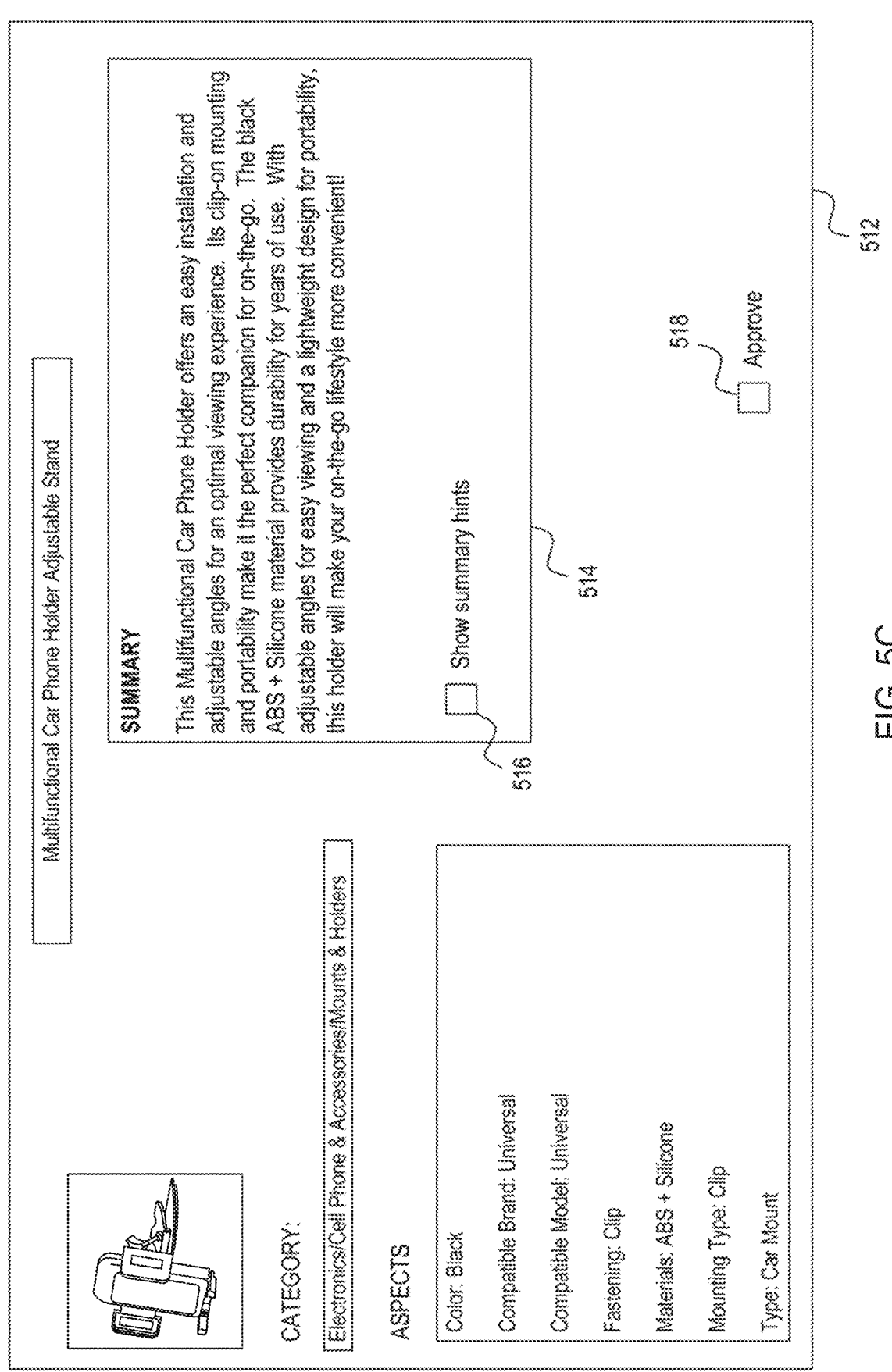

Multifunctional Car Phone Holder Adjustable Stand

CATEGORY:

Electronics/Cell Phone & Accessories/Mounts & Holders

ASPECTS

Color: Black

Compatible Brand: Universal

Compatible Model: Universal

Fastening: Clip

Materials: ABS + Silicone

Mounting Type: Clip

Type: Car Mount

SUMMARY

This Multifunctional Car Phone Holder offers an easy installation and adjustable angles for an optimal viewing experience. Its clip-on mounting and portability make it the perfect companion for on-the-go. The black ABS + Silicone material provides durability for years of use. With adjustable angles for easy viewing and a lightweight design for portability, this holder will make your on-the-go lifestyle more convenient!

□ Show summary hints
516

514

□ Approve
518

MINIMIZING LARGE LANGUAGE MODEL HALLUCINATIONS IN GENERATED SUMMARIES

TECHNICAL FIELD

The subject matter disclosed herein generally relates to use of large language models. Specifically, the present disclosure addresses systems and methods for minimizing large language model hallucinations in generated summaries.

BACKGROUND

Recently, large language models (LLMs) have become the de-facto standard for generative artificial intelligence solutions. Typically, the LLMs are used to generate data based on some input. Based on how LLMs are trained, however, they are notoriously prone to hallucinations-generating text that is non-factual and imaginative. For many use cases, it can be highly risky to use outputs of the LLMs without the ability to minimize these hallucinations. In some methods for minimizing hallucinations, auxiliary context or knowledge needs to be provided to the LLM. Unfortunately, obtaining such context or knowledge can be difficult, computationally expensive (e.g., crawling external sources), and limit an ability to scale beyond specific use cases.

BRIEF DESCRIPTION OF THE DRAWINGS

FIG. 5A-FIG. 5C are example user interfaces displayed on a client device for receiving inputs used to prompt generation of a summary and presenting the generated summary, according to example implementations.

DETAILED DESCRIPTION

Figure 1:
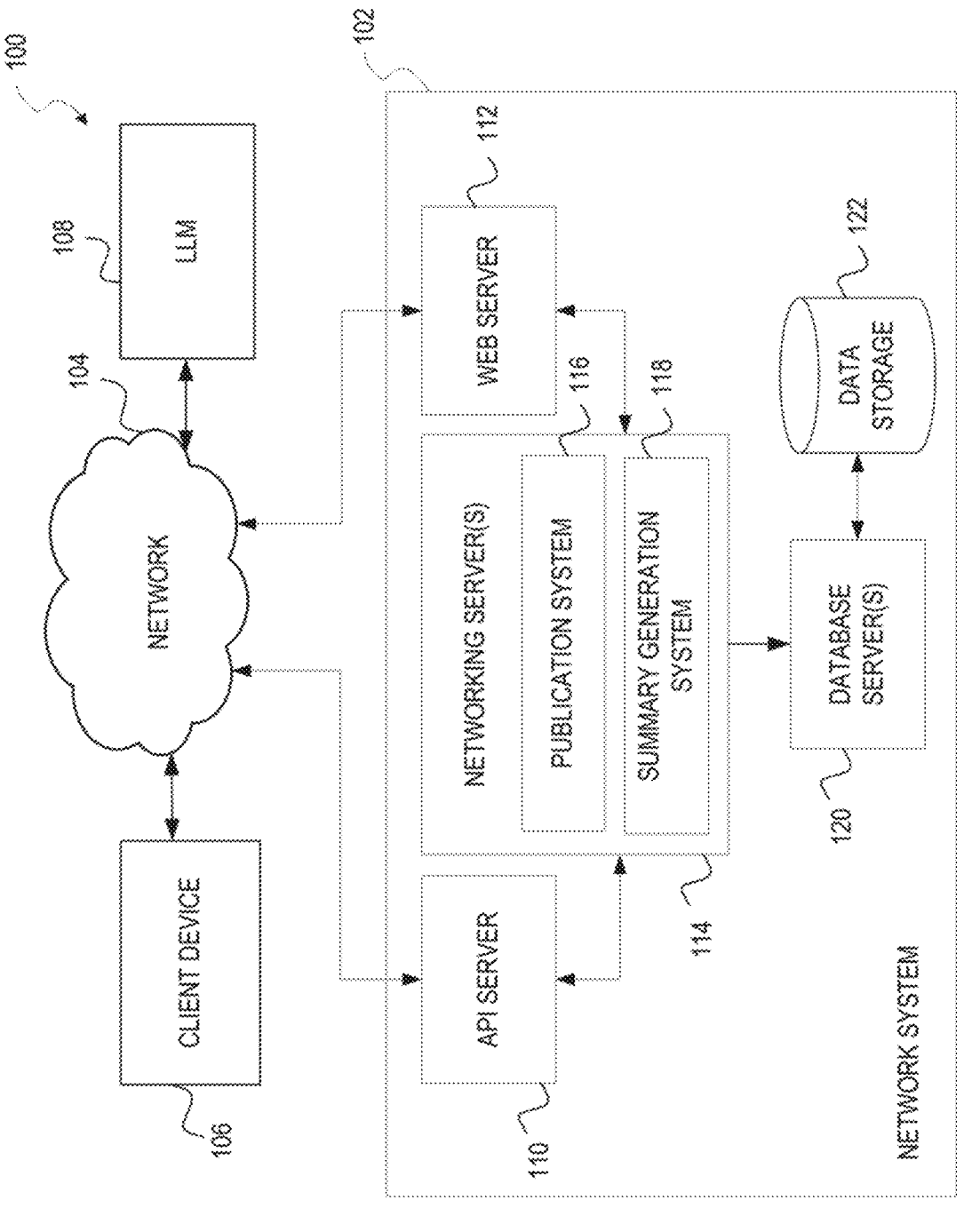
FIG. 1 is a diagram illustrating an example network environment suitable for minimizing large language model (LLM) hallucinations in generated summaries, according to example implementations.

The description that follows describes systems, methods, techniques, instruction sequences, and computing machine program products that illustrate examples of the present subject matter. In the following description, for purposes of explanation, numerous specific details are set forth in order to provide an understanding of various examples of the present subject matter. It will be evident, however, to those skilled in the art, that examples of the present subject matter may be practiced without some or other of these specific details. Examples merely typify possible variations. Unless explicitly stated otherwise, structures (e.g., structural components) are optional and may be combined or subdivided, and operations (e.g., in a procedure, algorithm, or other function) may vary in sequence or be combined or subdivided.

Systems and methods that minimize hallucinations in large language model (LLM)-generated summaries are discussed herein. LLMs are typically trained on a lot of data, but are not constrained (e.g., not bounded or grounded to some context). As a result, LLMs may generate data that is fake or not supported in the real world. This type of hallucination is an explicit hallucination. In these cases, knowledge is needed in order to verify whether the data is true or false. LLMs can also generate data that is intrinsic and contradicts itself. These intrinsic hallucinations are not types where knowledge is needed to verify since they are internal contradictions. For example, one sentence indicates that an item is blue, but a next sentence indicates it is green. Both explicit and intrinsic hallucinations need to be avoided or minimized if data is to be reliable.

Example implementations use a self-critic approach to minimize hallucinations in generated data and more particularly, in generated summaries. Example implementations utilize a summary generation piped approach that comprises several generation stages using the LLM. The first aspect is to tightly ground the summary being generated on the subject itself. Hence, the LLM is not allowed to suggest more than what is asked of it.

In a first set of generative stages, an initial summary is generated. For a given subject having a list of aspects, the LLM is prompted to recommend a list of features that are important to a given category of the subject. Next, the LLM is prompted to match the list of features with the subject's actual aspects or features. Only features that exist within the subject (e.g., matches an aspect) will be used in a later stage to emphasize the subject's description during summary generation. Thus, this stage already avoids many potential model hallucinations that would have occurred if a given subject does not have a given feature for the category but the LLM generates content just to satisfy its own belief about the domain. With the focus features that match for emphasis, the LLM is prompted to provide tips with respect to the list of focus features. Finally, the LLM is prompted to generate an initial summary based on the category, a title (if provided), and given aspects of the subject. The LLM is further prompted to emphasize the focus features and utilize the tips.

The next stages further minimize potential hallucinations that exist within the LLM's ability to summarize the subject. In a next stage, given the generated initial summary, the LLM is prompted to suggest a list of factual polar (e.g., yes/no) questions that can be asked about the initial summary. Given the list of questions and the subject in mind, the LLM is asked, in a further stage, to answer the questions without any knowledge of the initial summary (e.g., the LLM has no knowledge of the initial summary). The LLM will return a list of answers. Questions that received a negative answer (e.g., no) or unknown answer (e.g., unrated, N/A) are filtered out and/or the positive questions (e.g., questions that received a positive answer) are identified. In a final summary generation stage, the LLM is prompted to refine the initial summary that was previously generated by only considering the parts that are relevant to the questions that remained (e.g., those that received a "yes" answer).

As a result, example implementations provide a technical solution to the technical problem of minimizing hallucinations in LLM-generated summaries. In particular, the technical solution prompts the LLM to generate an initial summary that emphasizes tips or features that are relevant to the subject. A self-critic approach is then implemented by prompting the LLM to generate a list of questions based on the initial summary, and to answer the questions using only internal knowledge of the LLM. Negatively answered questions are filtered out and the LLM is then prompted to refine the initial summary based on elements that are relevant to the remaining questions.

FIG. 1 is a diagram illustrating an example network environment 100 suitable for minimizing large language model (LLM) hallucinations in generated summaries, according to example implementations. A network system 102 provides server-side functionality via a communication network 104 (e.g., the Internet, wireless network, cellular network, or a Wide Area Network (WAN)) to a client device 106. The network system 102 is configured to trigger various operations at a large language model (LLM) 108, as will be discussed in more detail below.

In various cases, the client device 106 is a device associated with a user account of a user of the network system 102 that wants to generate data, and more particular a summary, using functionalities of the network system 102. The client device 106 may comprise, but is not limited to, a smartphone, a tablet, a laptop, multi-processor systems, microprocessor-based or programmable consumer electronics, a desktop computer, a server, or any other communication device that can access the network system 102. The client device 106 can include an application that exchanges data, via the network 104, with the network system 102. For example, the application can be browser application or a local version of an application associated with the network system 102 that can provide data to and access data from one or more components at the network system 102.

In example implementations, the client device 106 interfaces with the network system 102 via a connection with the network 104. Depending on the form of the client device 106, any of a variety of types of connections and networks 104 may be used. For example, the connection may be Code Division Multiple Access (CDMA) connection, a Global System for Mobile communications (GSM) connection, or another type of cellular connection. Such a connection may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, or other data transfer technology (e.g., fourth generation wireless, 4G networks, 5G networks). When such technology is employed, the network 104 includes a cellular network that has a plurality of cell sites of overlapping geographic coverage, interconnected by cellular telephone exchanges. These cellular telephone exchanges are coupled to a network backbone (e.g., the public switched telephone network (PSTN), a packet-switched data network, or other types of networks.

In another example, the connection to the network 104 is a Wireless Fidelity (e.g., Wi-Fi, IEEE 802.11x type) connection, a Worldwide Interoperability for Microwave Access (WiMAX) connection, or another type of wireless data connection. In such an example, the network 104 includes one or more wireless access points coupled to a local area network (LAN), a wide area network (WAN), the Internet, or another packet-switched data network. In yet another example, the connection to the network 104 is a wired connection (e.g., an Ethernet link) and the network 104 is a LAN, a WAN, the Internet, or another packet-switched data network. Accordingly, a variety of different configurations are expressly contemplated.

Additionally, the client device 106 comprises a display component (not shown) to display information (e.g., in the form of user interfaces) as will be discussed in more detail below. The client device 106 can be operated by a human user and/or a machine user.

The LLM 108 is a trained model that is configured to generate text and perform natural language processing tasks. Generally, the LLM 108 learns relationships from a large data set during a training process. The LLM 108 can then be used to generate text by taking an input and repeatedly predicting a next token or word, for example. In some implementations, the LLM 108 is a closed-source LLM. While the LLM 108 is shown outside of the network system 102 and communicatively coupled via the network 104, the LLM 108 can, in some implementations, be a part of the network system 102 (e.g., be located within the network system 102).

Turning specifically to the network system 102, an application programing interface (API) server 110 and a web server 112 are coupled to and provide programmatic and web interfaces respectively to one or more networking servers 114. The networking servers 114 host various systems including a publication system 116 and a summary generation system 118, each of which comprises a plurality of components and each of which can be embodied as a combination of hardware, software, and/or firmware.

The publication system 116 is configured to manage publications at the network system 102 including posting publications (e.g., listings) to the network environment 100. As such, the publication system 116 provides a number of publication functions and services to users that access the network system 102. In a commerce implementation, the publication system 116 can host a commerce application that provides a number of commerce functions and services to users, such as publishing, listing, and price-setting mechanisms whereby a seller may list (or publish information concerning) goods or services (also collectively referred to as "items") for sale. In a non-commerce implementation, the publication system 116 can host an application that provides functions for publishing documents, articles, reviews, feeds, or any other type of data that a user may generate for posting to the network environment 100.

The summary generation system 118 is configured to generate summaries that minimize hallucinations. These summaries are then used to generate the publications that are posted to the network environment 100 by the publication system 116. The summary generation system 118 will be discussed in more detail in connection with FIG. 2 below.

The networking servers 114 can be, in turn, coupled to one or more database servers 120 that facilitate access to one or more storage repositories or data storage 122. The data storage 122 is a storage device storing, for example, user accounts including user profiles of users of the network system 102 and indications of corresponding publications generated by each user.

Any of the systems, data storage, or devices (collectively referred to as "components") shown in, or associated with, FIG. 1 may be, include, or otherwise be implemented in a special-purpose (e.g., specialized or otherwise non-generic) computer that can be modified (e.g., configured or programmed by software, such as one or more software components of an application, operating system, firmware, middleware, or other program) to perform one or more of the functions described herein for that system or machine. For example, a special-purpose computer system able to implement any one or more of the methodologies described herein is discussed below with respect to FIG. 6, and such a special-purpose computer is a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any two or more of the components illustrated in FIG. 1 may be combined, and the functions described herein for any single component may be subdivided among multiple components. Functionalities of one component may, in alternative examples, be embodied in a different component. Additionally, any number of client devices 106 and data storage 122 may be embodied within the network environment 100. While only a single network system 102 is shown, alternatively, more than one network system 102 can be included (e.g., localized to a particular region).

Figure 2:
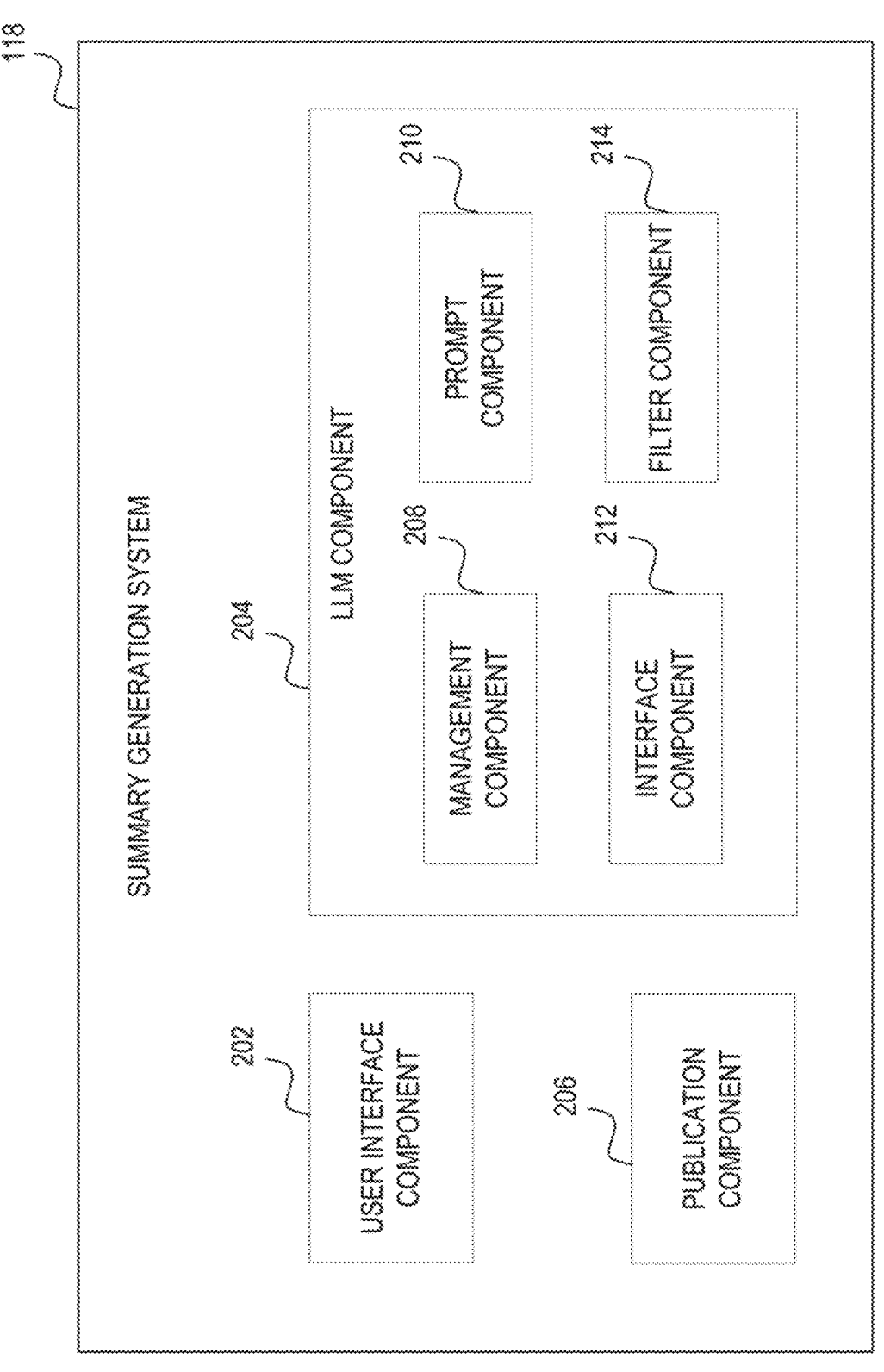
FIG. 2 is a diagram illustrating components of a summary generation system, according to example implementations.

FIG. 2 is a diagram illustrating components of the summary generation system 118, according to example implementations. In example implementations, the summary generation system 118 comprises a server that triggers (e.g., provides instructions or prompts) the LLM 108 to generate a summary that minimizes hallucinations using a self-critic approach. To enable these operations, the summary generation system 118 comprises a user interface component 202 and a LLM component 204 configured in communication with one another (e.g., via a bus, shared memory, or a switch). The summary generation system 118 may also comprise a publication component 206 and other components (not shown) that are not germane to example implementations.

The user interface component 202 is configured to generate and manage user interfaces that are displayed on the client device 106. The user interface component 202 can receive inputs via the user interface from the client device 106. For example, the user interface can receive a title of a publication to be generated and aspects of a subject (e.g., an item or topic) to be summarized. The user interface component 202 also generates and/or updates user interfaces to display summaries generated by the LLM 108. Example user interfaces are discussed further below in connection with FIG. 5A-FIG. 5C.

The LLM component 204 is configured to manage generation of prompts (e.g., instructions, questions, information, or coding that communicates to the LLM 108 what response is needed) and exchange of data with the LLM 108 in order to trigger the LLM 108 to generate a summary that minimizes or eliminates hallucination. Accordingly, the LLM component 204 includes a management component 208, a prompt component 210, an interface component 212, and a filter component 214.

The management component 208 is essentially a "brain" of the LLM component 204 that manages the different stages of the summary generation piped approach. The management component 208 instructs the prompt component 210 to generate particular prompts based on the different stages of the summary generation piped approach. In one implementation, the management component 208 uses or comprises LangChain. Thus, the management component 208 manages the information that is provided to the model (e.g., via the prompts generated by the prompt component 210), provides guidance to the prompt component 210 as to what the prompts should be based on the stage of the summary generation piped approach, and extracts information from outputs received from the LLM 108 such that the extracted information may be used in a further stage.

The prompt component 210 is a prompt generator that generates, without human interaction, prompts that trigger the LLM 108 to perform operations that result in a summary with minimized (or no) hallucinations. In example implementations, the prompt component 210 is an algorithm-driven tool that leverages machine learning algorithms and natural language processing techniques to analyze language patterns. As such, the prompt component 210 is trained to understand language patterns and context within training data sets. Based on the context of an input, the prompt component 210 can generate a unique prompt that is relevant to the context.

In example implementations, the prompt component 210 integrates the inputs received by the user interface component 202 into one or more prompts that trigger the LLM 108 to perform operations that result in the summary with minimized hallucinations. The context of the prompt may be provided by the management component 208. For example, the prompt component 210 generates prompts to trigger the LLM 108 to generate a list of features, perform a comparison using the list of features, generate tips, generate an initial summary, generate a list of questions based on the initial summary, answer the list of questions, and refine the initial summary. The operations for generating these prompts will be discussed in more detail in connection with FIG. 3 and FIG. 4.

The interface component 212 exchanges data with the LLM 108. In example implementations, the interface component 212 communicates (e.g., transmits via the network 104) the prompts generated by the prompt component 210 as instructions to the LLM 108. The interface component 212 then receives a generated response from the LLM 108. The generated response can include, for example, an initial summary and a revised summary that minimizes hallucinations. The generated response also includes intermediate response that are used by the prompt component 210 to generate further prompts as will be discussed in more detail below.

The filter component 214 is configured to filter data received from the LLM 108. During one of the stages of the summary generation piped approach, the prompt component 210 prompts LLM 108 to generate a list of questions based on the initial summary. The interface component 212 transmits this prompt and receives the list of questions. The prompt component 210 then generates a prompt for the LLM 108 to answer the list of questions based purely on internal knowledge and the input (e.g., a list of aspects for the subject) received by the user interface component 202. The interface component 212 transmits this second prompt and receives answers generated by the LLM 108. The filter component 214, analyzes the answers and filters out any questions that receive a negative or unknown answer and/or identifies questions that received positive answers. The remaining questions (e.g., positive questions) are used in a further prompt to refine the initial summary.

In some implementations, the summary generation system 118 also includes the publication component 206. The publication component 206 generates a publication that includes the refined summary. The publication can be, for example, a blurb for a news site or feed, a post for a social network, or a listing/item page for a commerce site. In some implementations, the publication is automatically generated upon approval of the refined summary. The generated publication is then transmitted to the publication system 116 for posting/publication on the network environment 100 (e.g., to a particular website). In an alternative implementation, the publication component 206 can be located at the publication system 116. In this implementation, the summary generation system 118 transmits the refined summary to the publication component 206 at the publication system 116.

Figure 3:
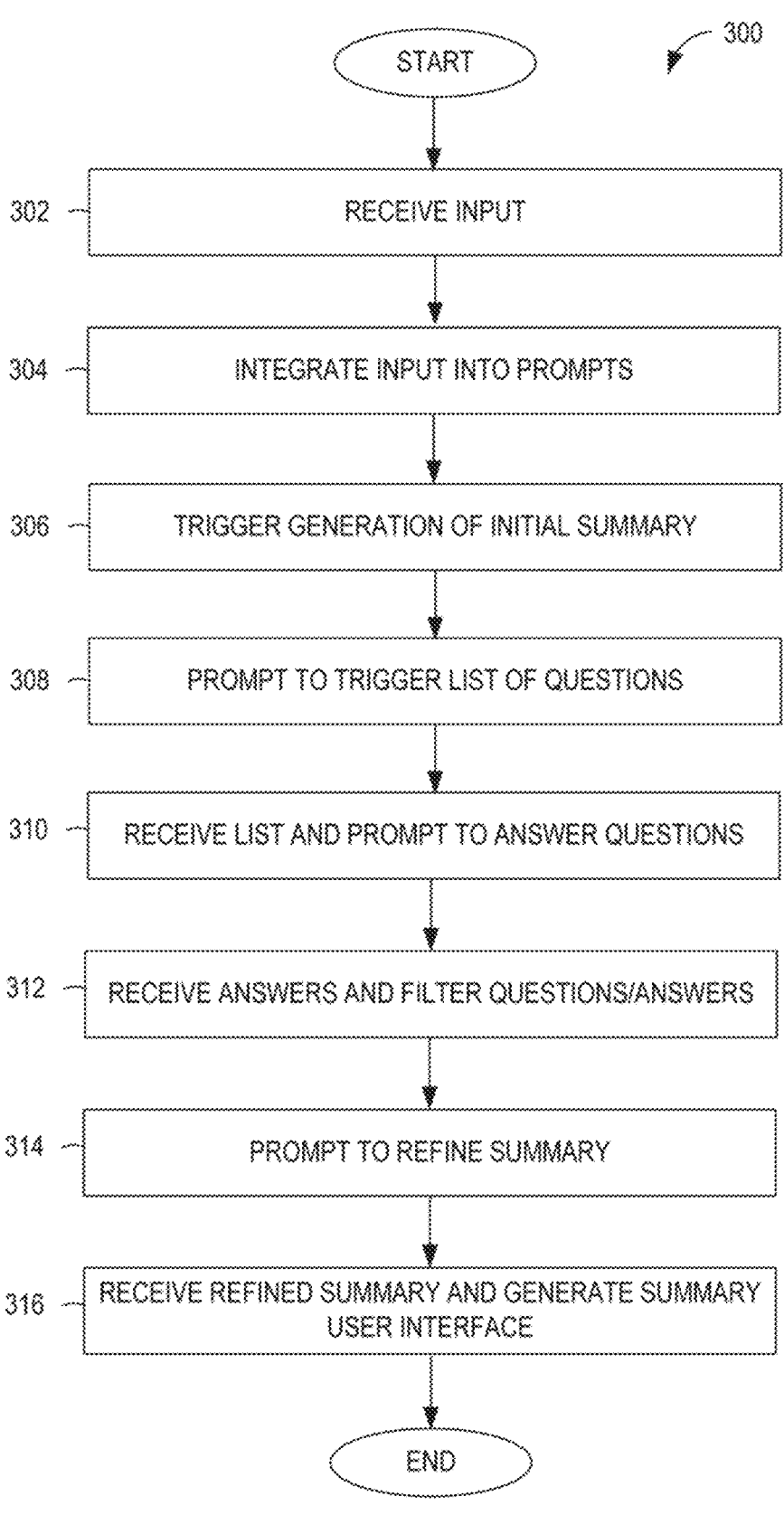
FIG. 3 is a flowchart illustrating operations of a method for generating and displaying a summary with minimized hallucinations, according to example implementations.

FIG. 3 is a flowchart illustrating operations of a method 300 for generating and displaying a summary with minimized hallucinations, according to example implementations. Operations in the method 300 may be performed by the summary generation system 118, using components described above with respect to FIG. 2. Accordingly, the method 300 is described by way of example with reference to the summary generation system 118. However, it shall be appreciated that at least some of the operations of the method 300 may be deployed on various other hardware configurations or be performed by similar components residing elsewhere in the network environment 100. Therefore, the method 300 is not intended to be limited to the summary generation system 118.

In operation 302, the user interface component 202 receives an input from the client device 106. In example implementations, the input includes an indication of a category, a list of one or more aspects of a subject of the summary, and/or a title associated with the subject. In some cases, the input can also include one or more images associated with the subject. Entry of information that comprises the input is the only interaction required from a user of the client device 106 to generate the summary with minimized hallucination.

In operation 304 the LLM component 204 integrates information from the input into prompts that trigger the generation of an initial summary. In example implementations, the management component 208 receives the input from the user interface component 202. The management component 208 extracts the title, list of aspects, and/or the category from the input, as needed, and provides instructions to the prompt component 210 to generate the prompts to trigger the generation of the initial summary.

Using the prompts, the LLM component 204 triggers generation of an initial summary in operation 306. Accordingly, the interface component 212, communicates the prompts to the LLM 108. In response, an initial summary is returned from the LLM 108 to the interface component 212. The operations for prompting the generation of the initial summary are discussed in more detail in connection with FIG. 4.

In operation 308, the LLM component 204 prompts the LLM 108 to trigger generation of a list of factual questions that can be asked about the initial summary. Factual questions are questions with straightforward answers that are frequently either right or wrong or have only one correct answer. In example implementations, the management component 208 determines that a next stage of the summary generation piped approach is to generate this list of questions. Thus, the management component provides the initial summary and corresponding instructions to the prompt generator 210 to generate this prompt. Using the initial summary, the prompt component 210 generates the prompt for the list of questions. In example implementations, the factual questions comprise a list of polar questions that can be verifiable with a yes (positive) or no (negative) answer, and, in some cases, an unknown answer (e.g., not applicable or unrated answer). For example, if the subject is a watch, then the question may ask is the watch waterproof. The prompt is then communicated by the interface component 212 to the LLM 108.

In operation 310, the LLM component 204 receives the list of questions and prompts the LLM 108 to answer the list of questions without context or knowledge of the initial summary. Based on a next stage of the summary generation piped approach comprising triggering the LLM 108 to answer the list of questions, the management component 208 instructs the prompt component 210 to generate this next prompt. In some cases, the initial information from the input may be included in this prompt. Thus, the management component 208 can provide the prompt component 210 with the list of aspects and/or the title from the input, the list of questions generated by the LLM 108, and instructions to generate a prompt that causes the LLM 108 to determine answers to the list of questions based solely on the list of aspects and/or title and internal knowledge of the LLM 108. In other cases, the list of aspects and title may not be provided as part of the prompt and the LLM 108 is prompted to answer based solely on its internal knowledge. Because the LLM 108 does not have context of the initial summary in order to extract any answers, the LLM 108 is not likely to "fake" any answers. If the LLM 108 does not know an answer (e.g., whether it is yes or no), the LLM 108 will answer with "unknown" (e.g., not applicable, unrated). This next prompt is then communicated by the interface component 212 to the LLM 108.

In operation 312, the LLM component 204 receives the answers and filters the list of questions based on the answers to identify questions that receive positive answers. In example implementations, the management component 208 provides the list of answers along with the list of questions to the filter component 206. The filter component 206 reviews the answers and filters out any questions on the list that received a negative (e.g., no) or unknown (e.g., not applicable, unrated) answer. These filtered out questions (e.g., negative questions) typically are not important to the context of the summary. The remaining questions (e.g., positive questions) are associated with facts that can be relied on. The filter component 206 may provide the list of remaining questions back to the management component 208.

In operation 314, the LLM component 204 prompts the LLM 108 to generate a refined summary. In this stage, the management component 208 instructs the prompt component 210 to generate a final prompt to generate the refined summary and provides the prompt component 210 with the initial summary and the list of remaining questions. The prompt component 210 generates a prompt that asks the LLM 108 to refine the initial summary by only considering elements that are relevant to the list of remaining questions.

In operation 316, the refined summary is received and displayed on the client device 106. In example implementations, the summary generation system 118 (e.g., the user interface component 202) generates (or updates) a summary user interface that is displayed on the client device 106. The summary user interface displays the refined summary for user review. The summary user interface can also include any images that were uploaded as part of the input, the title, an indication of the category, and/or the list of aspects. In example implementations, the summary user interface also includes an approval icon. Selection of the approval icon triggers the automatic generation of a publication by the publication component 206 that includes the refined summary.

The method 300 provides a self-critic approach for generating data, here a summary, by the LLM 108 that minimizes hallucinations. Unlike previous approaches which prompt LLMs to "rethink" their solutions (e.g., "chain-of-thought" methods), example implementations actively prompt the LLM 108 to suggest questions (operation 308) that can validate statements that the LLM 108, itself, has proposed in the initial summary. The filtering operation (operation 312) validates the LLM 108 independent of the initial summary. This has two main reasons. First, LLMs are highly trained for question/answer tasks, hence, the LLM's high capability to answer factoid questions is utilized. Since the LLM 108 is detached from the initial summary, the LLM 108 will use proper knowledge to return an answer and not try to maximize a likelihood of next word generation given context of the initial summary. Secondly, the LLM 108 is only asked to answer with a single word or abbreviation (e.g., yes, no, unknown, unrated, N/A) which again limits the LLM's way of thought. Hence, questions that the LLM 108 answers with a negative or unknown response contradict its own statement in the context of the initial summary and hence, the summary generation system 118 refrains from using them. As a result, the summary generation system 118 minimizes potential hallucinations.

Figure 4:
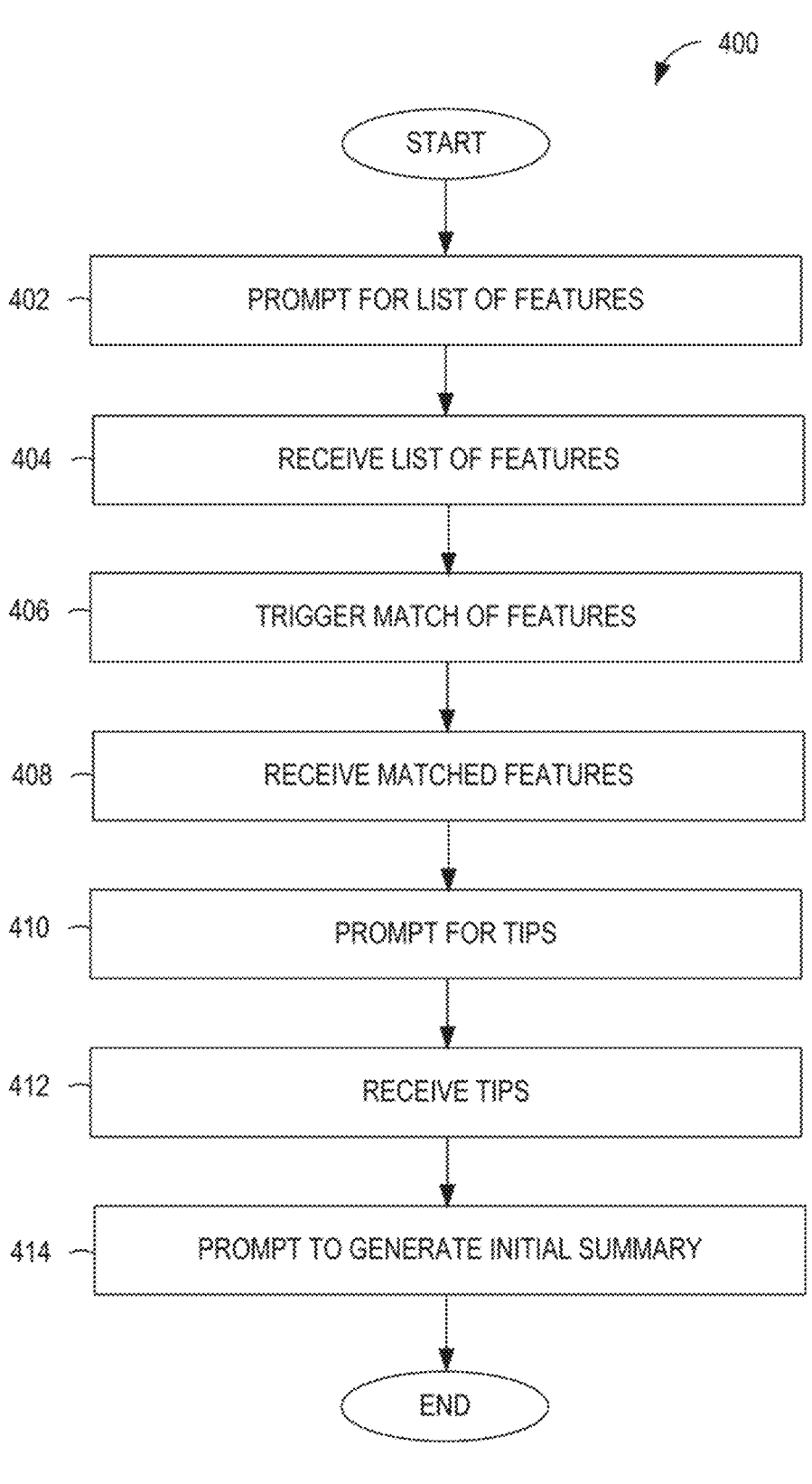
FIG. 4 is a flowchart illustrating operations of a method for generating an initial summary that is refined to minimize hallucinations, according to example implementations.

FIG. 4 is a flowchart illustrating operations of a method 400 for triggering the generation of the initial summary (operations 304 and 306), according to example implementations. Operations in the method 400 may be performed by the summary generation system 118, using components described above with respect to FIG. 2. Accordingly, the method 400 is described by way of example with reference to the summary generation system 118. However, it shall be appreciated that at least some of the operations of the method 400 may be deployed on various other hardware configurations or be performed by similar components residing elsewhere in the network environment 100. Therefore, the method 400 is not intended to be limited to the summary generation system 118.

In operation 402, the LLM component 204 prompts the LLM 108 for a list of features associated with the category of the subject. Accordingly, the management component 208 extracts or identifies the category from the input. The management component 208 instructs the prompt component 210 to generate the prompt using the category and requesting the LLM 108 to provide the list of features (e.g., feature names) that are important for the given category. The prompt does not provide any information regarding the subject (e.g., an item for sale), but just indicates a category of the subject (e.g., a category of the item for sale). For example, if the item is a Maytag top loading washer model number MVWX655DW, the category is washing machines. This prompt is then communicated to the LLM 108 by the interface component 212.

In operation 404, the list of features is received by the summary generation system 118 (e.g., the interface component 212). For the washing machine category, the list of features can include, for example, capacity, number of cycles, energy consumption, dimensions, and product type (e.g., top or front loading).

In operation 406, the LLM component 204 prompts the LLM to match the list of features with the subject's actual features. The management component 208 extracts/identifies the list of aspects from the input and provides the list of aspects along with the list of features to the prompt component 210. The management component 208 instructs the prompt component 210 to generate a prompt to trigger the LLM 108 to match the actual features from the list of aspect to the list of features generated by the LLM 108. This prompt is then communicated to the LLM 108 by the interface component 212.

In operation 408, the matched features are received from the LLM 108. The matched features are focused features that are relevant to generating the summary because these features exist within the subject. This process helps to avoid many potential hallucinations by grounding the generation of the summary to features that exists within the subject.

Given the focused features, the LLM component 204 prompts for tips with respect to the focused features in operation 410. Here, the management component 208 instructs the prompt component 210 to generate a prompt given the focused features. For example, if capacity is an important feature for washing machines and exists within the subject (e.g., indicated as an aspect for the Maytag washer), the prompt can ask the LLM 108 to give a tip with respect to capacity. Thus, the LLM 108 is triggered to provide tips about the focused features that are related to the subject in the specific category.

In operation 412, the LLM component 204 receives one or more tips from the LLM 108. In the Maytag washer example, the LLM 108 can indicate that for this category (e.g., washing machines), a minimum of 8 kilograms of capacity is considered a good product.

Given the tips, the LLM component 204 prompts, in operation 414, the LLM 108 to generate the initial summary. The management component 208 provides instructions to the prompt component 210 to generate a prompt that includes the one or more tips, the category, and the list of aspects. The prompt can also include the title from the input. The prompt can indicate that the focus features and tips be emphasized in the initial summary.

Given the initial summary, the continuing operations of the method 300 are performed to revise/refine the initial summary and minimize hallucinations even further.

Figure 5A:
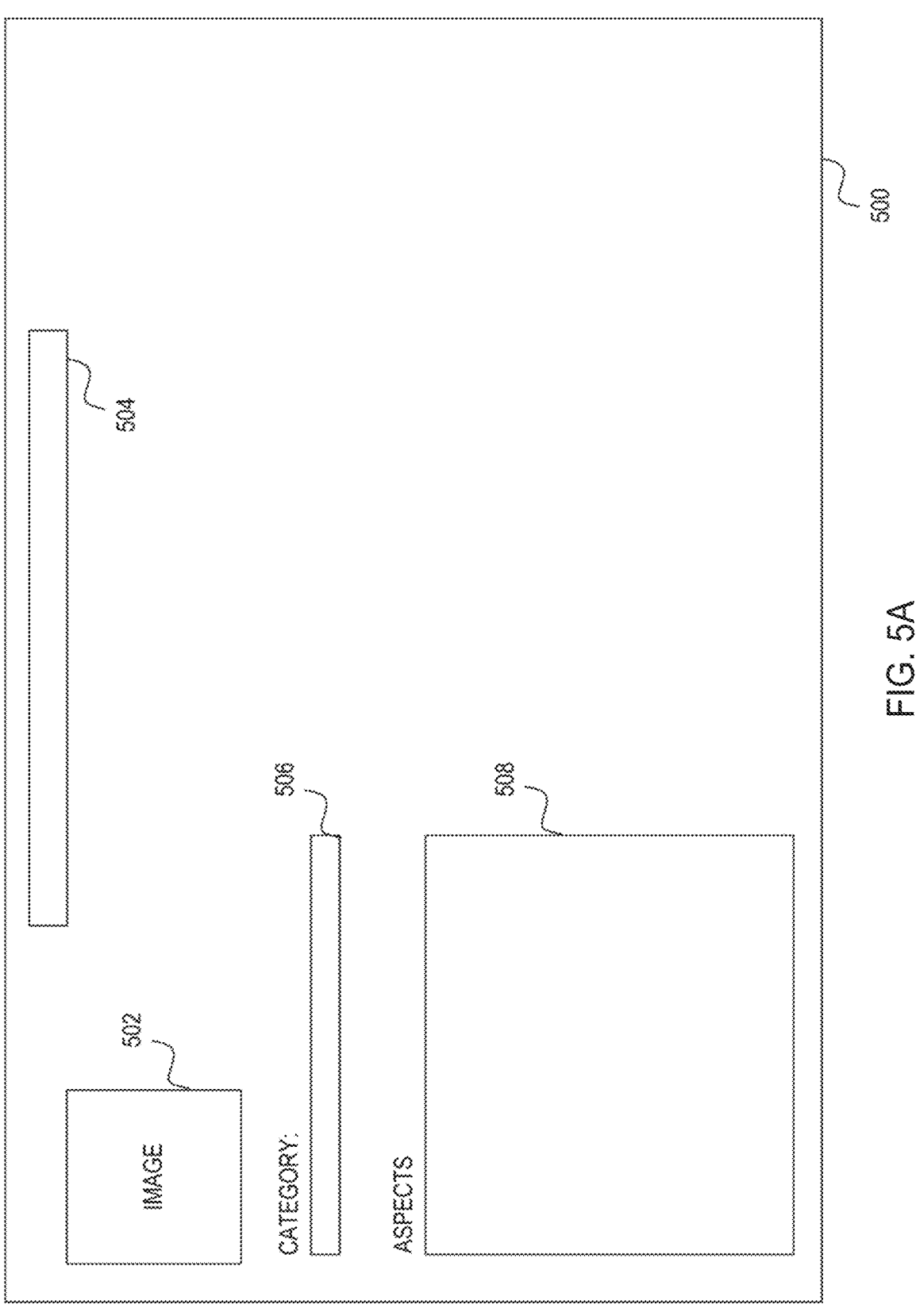
Figure 5B:
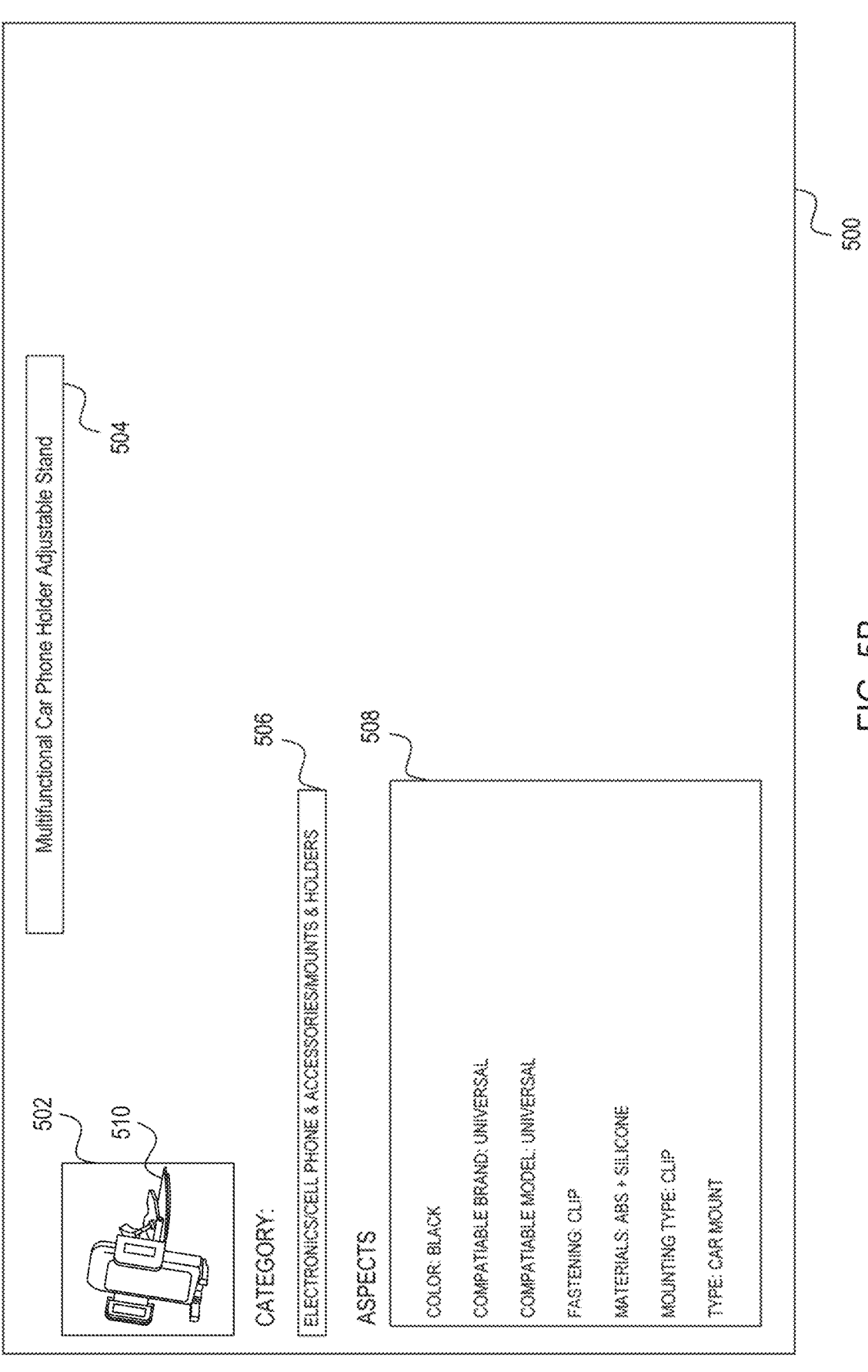

FIG. 5A-FIG. 5C are example user interfaces displayed on the client device 106 for receiving inputs used to prompt generation of a summary and presenting the generated summary. In the present example, the user interfaces are used to generate an item publication. In FIG. 5A, an initial user interface 500 is generated by the user interface component 202 and displayed on the client device 106. The initial user interface 500 includes an image portion 502, a title field 504, a category field 506, and an aspects field 506.

Referring now to FIG. 5B, a user of the client device 104 has entered a title in the title field 504 for a subject of the summary. For example, the entered title is "Multifunctional Car Phone Holder Adjustable Stand," and the subject is an item (e.g., a phone holder for a car) for sale. The user has also uploaded an image 510 of the subject.

In some implementations, the user enters or selects (e.g., from a drop-down menu), a category for the subject in the category field 506. In some cases, the categories available for selection in the drop-down menu may be determined by the summary generation system 118 (e.g., user interface component) based on the title entered in the title field 504. In some cases, the summary generation system 118 identifies a category based on the entered title and the user can change the category if needed. In the present example, the category is "Electronics/Cell Phone & Accessories/Mounts & Holder."

The user also has entered a list of aspects for the subject in the aspects field 506. In the present example, the aspects include a color (black), a compatible brand (universal), a compatible model (universal), a fastening type (clip), materials (ABS and silicone), a mounting type (clip), and a use type (car mount).

Given the inputs (e.g., title, category, and list of aspects), the summary generation system 118 generates the prompts to trigger the LLM to generate an initial summary and to refine the initial summary to minimize hallucinations. The refined summary is then returned to the summary generation system 118. The user interface component 202 generates an updated user interface that displays the refined summary. FIG. 5C illustrates an example of the updated user interface 512 that displays the refined summary in a summary section 514. The user can make edits to the refined summary or use it as-is.

The summary section 514 also includes a selectable option 516 to show summary hints. Selection of the selectable option 516 causes the user interface component 202 to update the summary section 514 to include the summary hints. In example implementations, the summary hints comprise the tips generated by the LLM 108.

An approve option 518 is also included in the user interface 512. Selection of the approve option 516 causes the publication component 212 to automatically generate a publication using the refined summary along with the title, image, and/or the list of aspects. In one implementation, the publication may appear similar to the user interface shown in FIG. 3C.

Figure 6:
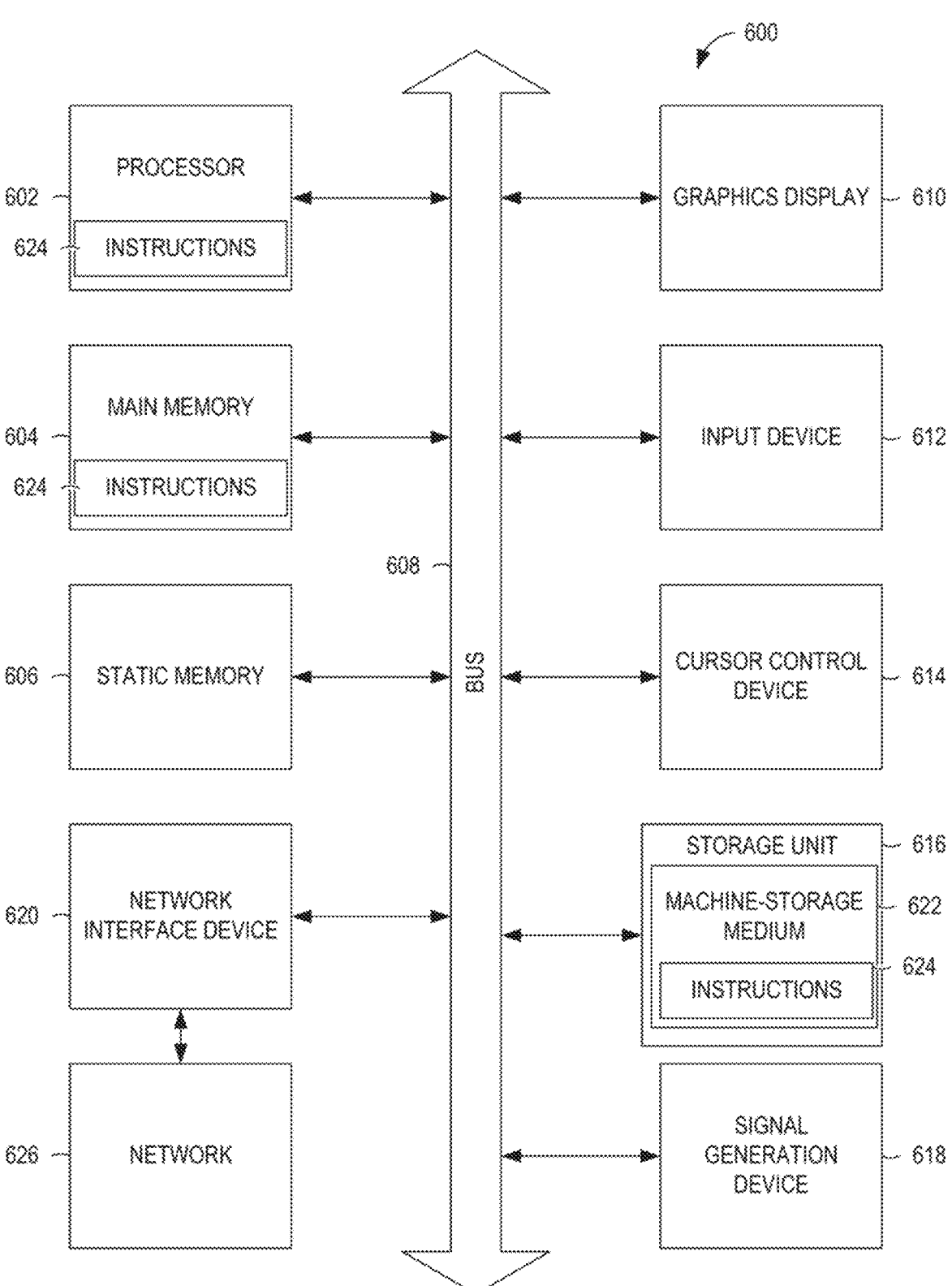
FIG. 6 is a block diagram illustrating components of a machine, according to some examples, able to read instructions from a machine-storage medium and perform any one or more of the methodologies discussed herein.

FIG. 6 illustrates components of a machine 600, according to some example implementations, that is able to read instructions from a machine-storage medium (e.g., a machine-storage device, a non-transitory machine-storage medium, a computer-storage medium, or any suitable combination thereof) and perform any one or more of the methodologies discussed herein. Specifically, FIG. 6 shows a diagrammatic representation of the machine 600 in the example form of a computer device (e.g., a computer) and within which instructions 624 (e.g., software, a program, an application, an applet, an app, or other executable code) for causing the machine 600 to perform any one or more of the methodologies discussed herein may be executed, in whole or in part.

For example, the instructions 624 may cause the machine 600 to execute the flow diagram of FIG. 3 and FIG. 4. In one implementation, the instructions 624 can transform the machine 600 into a particular machine (e.g., specially configured machine) programmed to carry out the described and illustrated functions in the manner described.

In alternative implementations, the machine 600 operates as a standalone device or may be connected (e.g., networked) to other machines. In a networked deployment, the machine 600 may operate in the capacity of a server machine or a client machine in a server-client network environment, or as a peer machine in a peer-to-peer (or distributed) network environment. The machine 600 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 624 (sequentially or otherwise) that specify actions to be taken by that machine. Further, while only a single machine is illustrated, the term "machine" shall also be taken to include a collection of machines that individually or jointly execute the instructions 624 to perform any one or more of the methodologies discussed herein.

The machine 600 includes a processor 602 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 604, and a static memory 606, which are configured to communicate with each other via a bus 608. The processor 602 may contain microcircuits that are configurable, temporarily or permanently, by some or all of the instructions 624 such that the processor 602 is configurable to perform any one or more of the methodologies described herein, in whole or in part. For example, a set of one or more microcircuits of the processor 602 may be configurable to execute one or more components described herein.

The machine 600 may further include a graphics display 610 (e.g., a plasma display panel (PDP), a light emitting diode (LED) display, a liquid crystal display (LCD), a projector, or a cathode ray tube (CRT), or any other display capable of displaying graphics or video). The machine 600 may also include an input device 612 (e.g., a keyboard), a cursor control device 614 (e.g., a mouse, a touchpad, a trackball, a joystick, a motion sensor, or other pointing instrument), a storage unit 616, a signal generation device 618 (e.g., a sound card, an amplifier, a speaker, a headphone jack, or any suitable combination thereof), and a network interface device 620.

The storage unit 616 includes a machine-storage medium 622 (e.g., a tangible machine-storage medium) on which is stored the instructions 624 (e.g., software) embodying any one or more of the methodologies or functions described herein. The instructions 624 may also reside, completely or at least partially, within the main memory 604, within the processor 602 (e.g., within the processor's cache memory), or both, before or during execution thereof by the machine 600. Accordingly, the main memory 604 and the processor 602 may be considered as machine-storage media (e.g., tangible and non-transitory machine-storage media). The instructions 624 may be transmitted or received over a network 626 via the network interface device 620.

In some example implementations, the machine 600 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the components described herein.

Executable Instructions and Machine-Storage Medium

The various memories (e.g., 604, 606, and/or memory of the processor(s) 602) and/or storage unit 616 may store one or more sets of instructions and data structures (e.g., software) 624 embodying or utilized by any one or more of the methodologies or functions described herein. These instructions, when executed by processor(s) 602 cause various operations to implement the disclosed implementations.

As used herein, the terms "machine-storage medium," "device-storage medium," "computer-storage medium" (referred to collectively as "machine-storage medium 622") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 622 include non-volatile memory, including by way of example semiconductor memory devices, for example, erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage medium or media, computer-storage medium or media, and device-storage medium or media 622 specifically exclude carrier waves, modulated data signals, and other such media, at least some of which are covered under the term "signal medium" discussed below. In this context, the machine-storage medium is non-transitory.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 624 may further be transmitted or received over a communications network 626 using a transmission medium via the network interface device 620 and utilizing any one of a number of well-known transfer protocols (e.g., HTTP). Examples of communication networks 626 include a local area network (LAN), a wide area network (WAN), the Internet, mobile telephone networks, plain old telephone service (POTS) networks, and wireless data networks (e.g., Wi-Fi, LTE, and WiMAX networks). The term "transmission medium" shall be taken to include any intangible medium that is capable of storing, encoding, or carrying instructions 624 for execution by the machine 600, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "hardware component" is a tangible unit capable of performing certain operations and may be configured or arranged in a certain physical manner. In various example implementations, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

In some implementations, a hardware component may be implemented mechanically, electronically, or any suitable combination thereof. For example, a hardware component may include dedicated circuitry or logic that is permanently configured to perform certain operations. For example, a hardware component may be a special-purpose processor, such as a field programmable gate array (FPGA) or an ASIC. A hardware component may also include programmable logic or circuitry that is temporarily configured by software to perform certain operations. For example, a hardware component may include software encompassed within a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations.

Accordingly, the term "hardware component" should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where the hardware component comprises a general-purpose processor configured by software to become a special-purpose processor, the general-purpose processor may be configured as respectively different special-purpose processors (e.g., comprising different hardware components) at different times. Software may accordingly configure a processor, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors.

Similarly, the methods described herein may be at least partially processor-implemented, a processor being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example implementations, the one or more processors or processor-implemented components may be located in a single geographic location (e.g., within a home environment, an office environment, or a server farm). In other example implementations, the one or more processors or processor-implemented components may be distributed across a number of geographic locations.

EXAMPLES

Example 1 is a method for minimizing hallucinations in a generated summary. The method comprises triggering, by a server, a large language model (LLM), to generate an initial summary for a subject; based on the initial summary, prompting, by the server, the LLM to generate a list of factual questions about the initial summary; triggering, by the server, the LLM to answer the list of factual questions without knowledge of the initial summary and using internal knowledge of the LLM; identifying, by the server, questions from the list of factual questions that received a positive answer; prompting, by the server, the LLM to generate a refined summary from the initial summary based on portions that are relevant to the questions; and generating a user interface that presents the refined summary.

In example 2, the subject matter of example 1 can optionally include wherein the list of factual questions comprises a list of factual polar questions.

In example 3, the subject matter of any of examples 1-2 can optionally include wherein identifying the questions further comprises filtering out one or more negative questions from the list of factual questions having a negative or unknown answer.

In example 4, the subject matter of any of examples 1-3 can optionally include wherein triggering generation of the initial summary comprises receiving an input including a category and list of aspects for the subject; integrating the input into a prompt; and transmitting the prompt to the LLM, the prompt causing the LLM to generate a list of features that are important for the category.

In example 5, the subject matter of any of examples 1-4 can optionally include wherein triggering generation of the initial summary further comprises integrating the list of aspects into a second prompt; and based on the second prompt, triggering the LLM to match the list of features with the list of aspects for the subject, the LLM generating the initial summary based on one or more aspects from the list of aspects that match a feature from the list of features.

In example 6, the subject matter of any of examples 1-5 can optionally include wherein triggering generation of the initial summary comprises prompting the LLM to provide a tip with respect to a feature from the list of features that matches an aspect from the list of aspects, wherein the initial summary emphasizes the feature and utilizes the tip.

In example 7, the subject matter of any of examples 1-6 can optionally include wherein the input further comprises a title associated with the subject, the initial summary being based, in part, on the title.

In example 8, the subject matter of any of examples 1-7 can optionally include wherein the LLM is a closed-source LLM.

In example 9, the subject matter of any of examples 1-8 can optionally include wherein the user interface further comprises an image of the subject, a list of aspects for the subject, and a selection to approve the refined summary.

In example 10, the subject matter of any of examples 1-9 can optionally include receiving an indication of approval of the refined summary; and in response to receiving the indication of approval, generating a publication that includes the refined summary and posting the publication to a network environment.

In example 11, the subject matter of any of examples 1-10 can optionally include wherein the subject is an item and the refined summary is a part of an item listing.

Example 12 is a system for minimizing hallucinations in a generated summary. The system comprises one or more processors and a memory storing instructions that, when executed by the one or more processors, cause the one or more processors to perform operations comprising triggering, by a server, a large language model (LLM), to generate an initial summary for a subject; based on the initial summary, prompting, by the server, the LLM to generate a list of factual questions about the initial summary; triggering, by the server, the LLM to answer the list of factual questions without knowledge of the initial summary and using internal knowledge of the LLM; identifying, by the server, questions from the list of factual questions that received a positive answer; prompting, by the server, the LLM to generate a refined summary from the initial summary based on portions that are relevant to the questions; and generating a user interface that presents the refined summary.

In example 13, the subject matter of example 12 can optionally include wherein the list of factual questions comprises a list of factual polar questions.

In example 14, the subject matter of any of examples 12-13 can optionally include wherein identifying the questions further comprises filtering out one or more negative questions from the list of factual questions having a negative or unknown answer.

In example 15, the subject matter of any of examples 13-14 can optionally include wherein triggering generation of the initial summary comprises receiving an input including a category and list of aspects for the subject; integrating the category into a prompt; and transmitting the prompt to the LLM, the prompt causing the LLM to generate a list of features that are important for the category.

In example 16, the subject matter of any of examples 13-15 can optionally include wherein triggering generation of the initial summary further comprises integrating the list of aspects into a second prompt; and based on the second prompt, triggering the LLM to match the list of features with the list of aspects for the subject, the LLM generating the initial summary based on one or more aspects from the list of aspects that match a feature from the list of features.

In example 17, the subject matter of any of examples 13-16 can optionally include wherein triggering generation of the initial summary comprises prompting the LLM to provide a tip with respect to a feature from the list of features that matches an aspect from the list of aspects, wherein the initial summary emphasizes the feature and utilizes the tip.

In example 18, the subject matter of any of examples 13-17 can optionally include wherein the input further comprises a title associated with the subject, the initial summary being based, in part, on the title.

In example 19, the subject matter of any of examples 13-18 can optionally include wherein the operations further comprise receiving an indication of approval of the refined summary; and in response to receiving the indication of approval, generating a publication that includes the refined summary and posting the publication to a network environment.

Example 20 is a computer-storage medium comprising instructions which, when executed by one or more processors of a machine, cause the machine to perform operations for minimizing hallucinations in a generated summary. The operations comprise triggering, by a server, a large language model (LLM), to generate an initial summary for a subject; based on the initial summary, prompting, by the server, the LLM to generate a list of factual questions about the initial summary; triggering, by the server, the LLM to answer the list of factual questions without knowledge of the initial summary and using internal knowledge of the LLM; identifying, by the server, questions from the list of factual questions that received a positive answer; prompting, by the server, the LLM to generate a refined summary from the initial summary based on portions that are relevant to the questions; and generating a user interface that presents the refined summary.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the present subject matter has been described with reference to specific examples, various modifications and changes may be made to these examples without departing from the broader scope of examples of the present invention. For instance, various examples or features thereof may be mixed and matched or made optional by a person of ordinary skill in the art. Such examples of the present subject matter may be referred to herein, individually or collectively, by the term "invention" merely for convenience and without intending to voluntarily limit the scope of this application to any single invention or present concept if more than one is, in fact, disclosed.

The examples illustrated herein are believed to be described in sufficient detail to enable those skilled in the art to practice the teachings disclosed. Other examples may be used and derived therefrom, such that structural and logical substitutions and changes may be made without departing from the scope of this disclosure. The Detailed Description, therefore, is not to be taken in a limiting sense, and the scope of various examples is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various examples of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of examples of the present invention as represented by the appended claims. The specification and drawings are, accordingly, to be regarded in an illustrative rather than a restrictive sense.

What is claimed is:

1. A method for minimizing hallucinations in generated summaries, the method comprising:

triggering, by a server, a large language model (LLM), to generate an initial summary for a subject;

based on the initial summary, prompting, by the server, the LLM to generate a list of factual questions about the initial summary;

triggering, by the server, the LLM to answer the list of factual questions without knowledge of the initial summary and using internal knowledge of the LLM;

identifying, by the server, questions from the list of factual questions that received a positive answer;

prompting, by the server, the LLM to generate a refined summary from the initial summary based on portions that are relevant to the identified questions; and generating a user interface that presents the refined summary.

2. The method of claim 1, wherein the list of factual questions comprises a list of factual polar questions.

3. The method of claim 1, wherein identifying the questions further comprises filtering out one or more negative questions from the list of factual questions having a negative or unknown answer.

4. The method of claim 1, wherein triggering generation of the initial summary comprises:

receiving an input including a category and a list of aspects for the subject;

integrating the category into a prompt; and transmitting the prompt to the LLM, the prompt causing the LLM to generate a list of features that are important for the category.

5. The method of claim 4, wherein triggering generation of the initial summary further comprises:

integrating the list of aspects into a second prompt; and based on the second prompt, triggering the LLM to match the list of features with the list of aspects for the subject, the LLM generating the initial summary based on one or more aspects from the list of aspects that match a feature from the list of features.

6. The method of claim 5, wherein triggering generation of the initial summary comprises:

prompting the LLM to provide a tip with respect to a first feature from the list of features that matches an aspect from the list of aspects, wherein the initial summary emphasizes the first feature and utilizes the tip.

7. The method of claim 4, wherein the input further comprises a title associated with the subject, the initial summary being based, in part, on the title.

8. The method of claim 1, wherein the LLM is a closed-source LLM.

9. The method of claim 1, wherein the user interface further comprises an image of the subject, a list of aspects for the subject, and a selection to approve the refined summary.

10. The method of claim 1, further comprising:

receiving an indication of approval of the refined summary; and in response to receiving the indication of approval, generating a publication that includes the refined summary and posting the publication to a network environment.

11. The method of claim 10, wherein the subject is an item and the refined summary is a part of an item listing.

12. A system comprising:

one or more processors; and a memory storing instructions that, when executed by the one or more processors, cause the one or more processors to perform operations comprising:

triggering, by a server, a large language model (LLM), to generate an initial summary for a subject;

based on the initial summary, prompting, by the server, the LLM to generate a list of factual questions about the initial summary;

triggering, by the server, the LLM to answer the list of factual questions without knowledge of the initial summary and using internal knowledge of the LLM;

identifying, by the server, questions from the list of factual questions that received a positive answer;

prompting, by the server, the LLM to generate a refined summary from the initial summary based on portions that are relevant to the identified questions; and generating a user interface that presents the refined summary.

13. The system of claim 12, wherein the list of factual questions comprises a list of factual polar questions.

14. The system of claim 12, wherein identifying the questions further comprises filtering out one or more negative questions from the list of factual questions having a negative or unknown answer.

15. The system of claim 12, wherein triggering generation of the initial summary comprises:

receiving an input including a category and a list of aspects for the subject;

integrating the category into a prompt; and transmitting the prompt to the LLM, the prompt causing the LLM to generate a list of features that are important for the category.

16. The system of claim 15, wherein triggering generation of the initial summary further comprises:

integrating the list of aspects into a second prompt; and based on the second prompt, triggering the LLM to match the list of features with the list of aspects for the subject, the LLM generating the initial summary based on one or more aspects from the list of aspects that match a feature from the list of features.

17. The system of claim 16, wherein triggering generation of the initial summary comprises:

prompting the LLM to provide a tip with respect to a first feature from the list of features that matches an aspect from the list of aspects, wherein the initial summary emphasizes the first feature and utilizes the tip.

18. The system of claim 15, wherein the input further comprises a title associated with the subject, the initial summary being based, in part, on the title.

19. The system of claim 12, wherein the operations further comprise:

receiving an indication of approval of the refined summary; and in response to receiving the indication of approval, generating a publication that includes the refined summary and posting the publication to a network environment.

20. A machine-storage medium comprising instructions which, when executed by one or more processors of a machine, cause the machine to perform operations comprising:

triggering, by a server, a large language model (LLM), to generate an initial summary for a subject;

based on the initial summary, prompting, by the server, the LLM to generate a list of factual questions about the initial summary;

triggering, by the server, the LLM to answer the list of factual questions without knowledge of the initial summary and using internal knowledge of the LLM;

identifying, by the server, questions from the list of factual questions that received a positive answer;

prompting, by the server, the LLM to generate a refined summary from the initial summary based on portions that are relevant to the identified questions; and generating a user interface that presents the refined summary.

\*    \*    \*    \*    \*